(12) United States Patent
Kaufmann

(10) Patent No.: US 12,014,242 B2
(45) Date of Patent: Jun. 18, 2024

(54) RELAY ATTACK DETECTION FOR INTERFACES USING COMMAND-RESPONSE PAIR

(71) Applicant: ASSA ABLOY AB, Stockholm (SE)

(72) Inventor: Martin Kaufmann, Graz (AT)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 17/929,442

(22) Filed: Sep. 2, 2022

(65) Prior Publication Data

US 2022/0414355 A1 Dec. 29, 2022

Related U.S. Application Data

(63) Continuation of application No. 16/998,012, filed on Aug. 20, 2020, now Pat. No. 11,449,691.

(51) Int. Cl.
*G06K 7/10* (2006.01)
*H04L 9/40* (2022.01)

(52) U.S. Cl.
CPC .......... *G06K 7/10257* (2013.01); *H04L 63/14* (2013.01); *H04L 63/1416* (2013.01)

(58) Field of Classification Search
CPC .... G06F 21/56; G06F 2221/032; G06F 21/34; G06F 21/42; G07C 9/28; G07C 9/00182; G07C 2009/00793; G07C 2209/61; G07C 9/00309; G07C 2009/00555; G06K 7/10257; H04L 63/14
See application file for complete search history.

(56) References Cited

U.S. PATENT DOCUMENTS

| | | |
|---|---|---|
| 3,824,539 A | 7/1974 | Horvath |
| 4,326,124 A | 4/1982 | Faude |
| 4,574,268 A | 3/1986 | Ohnishi |
| 4,862,139 A | 8/1989 | Fukamachi |
| 4,901,053 A | 2/1990 | Fukamachi |
| 5,375,120 A | 12/1994 | Hirano |
| 5,451,925 A | 9/1995 | Le |
| 5,883,443 A | 3/1999 | Wilson |

(Continued)

FOREIGN PATENT DOCUMENTS

| | | |
|---|---|---|
| JP | 2010102609 | 5/2010 |
| JP | 2011523798 | 8/2011 |

(Continued)

OTHER PUBLICATIONS

U.S. Appl. No. 16/998,012 11,449,691, filed Aug. 20, 2020, Relay Attack Detection for Interfaces Using Command-Response Pair.

(Continued)

*Primary Examiner* — Curtis J King
(74) *Attorney, Agent, or Firm* — Schwegman Lundberg & Woessner, P.A.

(57) ABSTRACT

A reader device of an access control system comprises physical layer circuitry and processing circuitry. The processing circuitry is operatively coupled to the physical layer circuitry and is configured to initiate transmission of a command to a credential device; determine a time duration from sending the command to the credential device to receiving a response to the command from the credential device; and generate an indication when the time duration exceeds a relay attack detection threshold time duration.

20 Claims, 5 Drawing Sheets

(56) References Cited

U.S. PATENT DOCUMENTS

| | | | |
|---|---|---|---|
| 6,049,268 | A | 4/2000 | Flick |
| 6,906,612 | B2 | 6/2005 | Ghabra |
| 7,042,342 | B2 | 5/2006 | Luo |
| 7,046,119 | B2 | 5/2006 | Ghabra |
| 7,738,588 | B2 | 6/2010 | Barrenscheen |
| 9,262,878 | B1 | 2/2016 | Ghabra |
| 9,455,998 | B2 * | 9/2016 | Ivanchykhin ........... H04L 63/08 |
| 9,496,936 | B2 | 11/2016 | Blatz |
| 9,710,983 | B2 * | 7/2017 | Asmar ............... G07C 9/00309 |
| 9,851,703 | B2 | 12/2017 | Cataldo |
| 9,911,259 | B1 * | 3/2018 | Ghabra .................... G07C 9/28 |
| 10,017,155 | B1 | 7/2018 | Allouche |
| 10,122,683 | B2 * | 11/2018 | Wilf ........................ H04L 67/01 |
| 10,235,823 | B1 | 3/2019 | Saleh |
| 10,427,643 | B1 | 10/2019 | Casamassima |
| 10,486,648 | B1 | 11/2019 | Lin |
| 10,521,984 | B1 | 12/2019 | Johansson et al. |
| 10,681,555 | B2 | 6/2020 | Reedman |
| 10,685,515 | B2 | 6/2020 | Hazebrouck |
| 2003/0001723 | A1 | 1/2003 | Masudaya |
| 2003/0222757 | A1 | 12/2003 | Ghabra |
| 2006/0044108 | A1 | 3/2006 | Nowottnick |
| 2006/0202798 | A1 | 9/2006 | Baumgartner |
| 2006/0273888 | A1 | 12/2006 | Baumgartner |
| 2007/0160206 | A1 | 7/2007 | Ostrander |
| 2008/0100427 | A1 | 5/2008 | Desai |
| 2008/0174446 | A1 | 7/2008 | Ghabra |
| 2010/0026509 | A1 | 2/2010 | Boehm |
| 2010/0082180 | A1 | 4/2010 | Wright |
| 2010/0308961 | A1 | 12/2010 | Ghabra |
| 2010/0321154 | A1 | 12/2010 | Ghabra |
| 2011/0148573 | A1 | 6/2011 | Ghabra |
| 2011/0309915 | A1 | 12/2011 | Cho |
| 2013/0072115 | A1 | 3/2013 | Dobyns |
| 2014/0215567 | A1 | 7/2014 | Yoshizawa |
| 2014/0240090 | A1 | 8/2014 | Mutti |
| 2014/0248898 | A1 | 9/2014 | O'Brien |
| 2014/0365776 | A1 | 12/2014 | Smets |
| 2015/0022332 | A1 | 1/2015 | Lin |
| 2015/0130589 | A1 | 5/2015 | Miyazawa |
| 2015/0222658 | A1 | 8/2015 | Kim |
| 2015/0280843 | A1 * | 10/2015 | Fucci ...................... G06F 21/32 455/41.2 |
| 2015/0302230 | A1 * | 10/2015 | Wacker ................... G06F 21/50 726/22 |
| 2016/0117877 | A1 | 4/2016 | Hamada |
| 2016/0200291 | A1 | 7/2016 | Kim |
| 2016/0267735 | A1 * | 9/2016 | Hamada ............. G07C 9/00309 |
| 2016/0332598 | A1 * | 11/2016 | Ghabra .................... B60R 25/30 |
| 2017/0372294 | A1 | 12/2017 | Pelletier |
| 2018/0007507 | A1 | 1/2018 | Ghabra |
| 2018/0096546 | A1 * | 4/2018 | Bartels .................... G07C 9/29 |
| 2018/0103414 | A1 | 4/2018 | Golsch |
| 2018/0265040 | A1 | 9/2018 | Nowottnick |
| 2018/0276926 | A1 * | 9/2018 | Hayashi .................. E05B 81/78 |
| 2018/0302422 | A1 | 10/2018 | Kishikawa |
| 2018/0312137 | A1 | 11/2018 | Neuhoff |
| 2018/0315266 | A1 | 11/2018 | Neuhoff |
| 2018/0374290 | A1 * | 12/2018 | Björkengren ......... H04W 12/08 |
| 2019/0005753 | A1 | 1/2019 | Leconte |
| 2019/0114857 | A1 * | 4/2019 | Gustin ............... G07C 9/00658 |
| 2019/0182672 | A1 | 6/2019 | Kuenzi et al. |
| 2019/0227539 | A1 | 7/2019 | Golgiri |
| 2019/0241154 | A1 * | 8/2019 | Elangovan ............ B60R 25/245 |
| 2019/0329732 | A1 * | 10/2019 | Hocke ................... B60R 25/245 |
| 2019/0373475 | A1 * | 12/2019 | Top ...................... H04W 12/037 |
| 2020/0217947 | A1 | 7/2020 | Stitt |
| 2020/0219343 | A1 * | 7/2020 | Stitt ...................... H04L 47/283 |
| 2020/0229206 | A1 | 7/2020 | Badic |
| 2020/0254968 | A1 * | 8/2020 | Hassani ............... H04B 17/318 |
| 2020/0334357 | A1 | 10/2020 | Patne |
| 2020/0351665 | A1 | 11/2020 | Kelly |
| 2021/0001806 | A1 * | 1/2021 | Kim ........................ B60R 25/24 |
| 2021/0120407 | A1 | 4/2021 | Neuhoff |
| 2021/0203658 | A1 | 7/2021 | Ohashi |
| 2021/0203659 | A1 | 7/2021 | Ohashi |
| 2022/0004220 | A1 | 1/2022 | Ito |
| 2022/0058353 | A1 | 2/2022 | Kaufmann |
| 2022/0417752 | A1 * | 12/2022 | Mori ..................... H04W 24/10 |
| 2023/0224709 | A1 | 7/2023 | Lerch et al. |

FOREIGN PATENT DOCUMENTS

| | | |
|---|---|---|
| JP | 2018020611 | 2/2018 |
| JP | 2019169790 | 10/2019 |
| JP | 2023538095 | 9/2023 |
| WO | WO-2022037817 A1 | 2/2022 |

OTHER PUBLICATIONS

"U.S. Appl. No. 16/998,012, Final Office Action dated Feb. 7, 2022", 12 pgs.

"U.S. Appl. No. 16/998,012, Non Final Office Action dated Aug. 5, 2021", 16 pgs.

"U.S. Appl. No. 16/998,012, Notice of Allowance dated May 17, 2022", 7 pgs.

"U.S. Appl. No. 16/998,012, Response filed May 6, 2022 to Final Office Action dated Feb. 7, 2022", 9 pgs.

"U.S. Appl. No. 16/998,012, Response filed Nov. 5, 2021 to Non Final Office Action dated Aug. 5, 2021", 10 pgs.

"International Application Serial No. PCT/EP2021/065006, International Search Report dated Aug. 16, 2021", 5 pgs.

"International Application Serial No. PCT/EP2021/065006, Written Opinion dated Aug. 16, 2021", 7 pgs.

Hancke, G P, et al., "Confidence in smart token proximity: Relay attacks revisited", Computers & Security, Elsevier Science Publishers. Amsterdam, NL, vol. 28, No. 7, (Oct. 1, 2009), 615-627.

"Japanese Application Serial No. 2023-512246, Notification of Reasons for Refusal mailed Mar. 19, 2024", with manual English translation, 10 pages.

"International Application Serial No. PCT EP2023 075281, International Search Report mailed Mar. 18, 2024", 3 pgs.

"International Application Serial No. PCT EP2023 075281, Written Opinion mailed Mar. 18, 2024", 8 pgs.

* cited by examiner

RELAY ATTACK DETECTION FOR INTERFACES USING COMMAND-RESPONSE PAIR

PRIORITY APPLICATION

This application is a continuation of U.S. application Ser. No. 16/998,012, filed Aug. 20, 2020, which is incorporated herein by reference in its entirety.

TECHNICAL FIELD

Embodiments illustrated and described herein generally relate to access control systems and to preventing security breaches in access control systems.

BACKGROUND

Access control systems grant physical access to an authorized user through a controlled portal such as a secured door. Additionally, remote identity authentication for applications such as mobile online shopping or mobile banking is now a common practice. Remote authentication often involves authentication information being exchanged between a user's mobile phone and a server performing authentication. Unfortunately, attempts to defeat systems that provide secure authentication occur often. A relay attack is a type of hacking technique that can lead to a security breach of an access control system.

DETAILED DESCRIPTION

A physical access control system (PACS) provides automatic physical access to an authorized user through a physical access point such as a secured door. Seamless access control systems grant physical access to an authorized user through the controlled portal without requiring intrusive actions of the user such as entering or swiping an access card at a card reader or entering a personal identification number (PIN) or password. The architecture of a PACS may vary significantly based on the application (e.g., a hotel, a residence, an office, etc.), the technology (e.g., access interfaces technology, door type, etc.), and the manufacturer.

Figure 1:
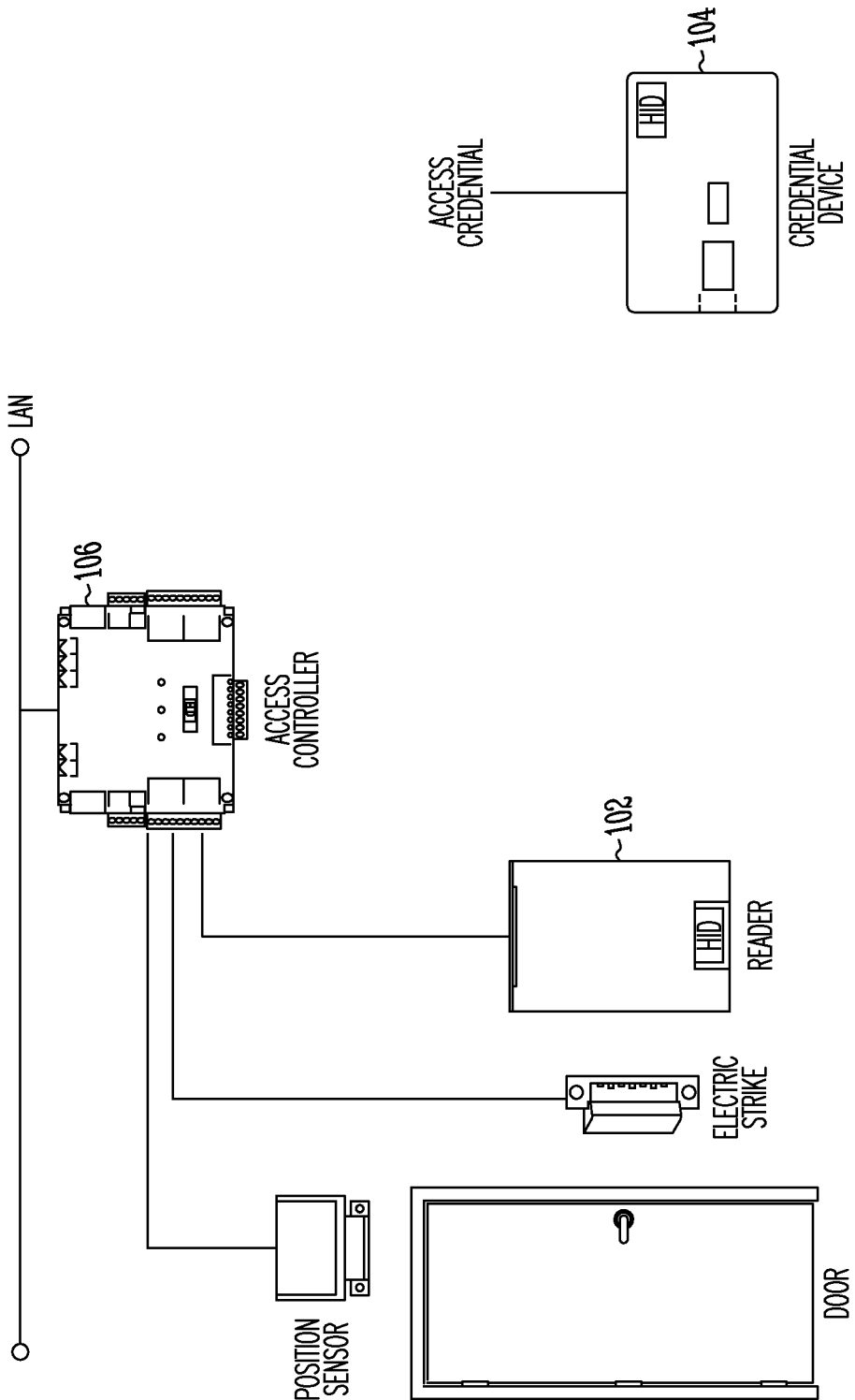
FIG. 1 is an illustration of an example of an access control system structure.

FIG. 1 is an illustration of a basic PACS structure useful for an office application. The Access Credential is a data object, a piece of knowledge (e.g., PIN, password, etc.), or a facet of the person's physical being (e.g., face, fingerprint, etc.) that provides proof of the person's identity. The Credential Device 104 stores the Access Credential when the Access Credential is a data object. The Credential Device 104 may be a smartcard or smartphone. Other examples of Credential Devices include, but are not limited to, proximity radio frequency identification based (RFID-based) cards, access control cards, credit cards, debit cards, passports, identification cards, key fobs, near field communication (NFC) enabled devices, mobile phones, personal digital assistants (PDAs), tags, or any other device configurable to emulate a virtual credential.

The Credential Device 104 can be referred to as the Access Credential. The Reader device 102 or other verifier device retrieves and authenticates the Access Credential when a Credential Device is used and sends the Access Credential to the Access Controller 106. The Access Controller 106 compares the Access Credential to an Access Control list and grants or denies access based on the comparison, such as by controlling an automatic lock on a door for example.

The functionality of an Access Controller 106 may be included in the Reader device 102. These Reader devices can be referred to as offline readers or standalone readers. If the unlocking mechanism is included as well, a device is referred to as smart door lock which is more typically used in residential applications. Devices such as smart door locks are often battery powered, and power consumption and battery lifetime can be key parameters for the devices.

In a PACS, an access sequence consists of four parts: Proof of Presence, Intent Detection, Authentication, and Authorization. The user approaches the door and presents their access credential or credential device. This provides the Proof of Presence and Intent portions of the sequence. The reader device checks the validity of the access credential (the Authentication portion) and sends it to the access controller (e.g., using a local area network or LAN), which grants or denies access (the Authorization portion). As explained above, seamless access is access granted without intrusive actions to show Intent (e.g., presenting a card, entering a password etc.), while maintaining the same level of security as a conventional access system.

Physical access control systems are susceptible to attempts for unauthorized access such as hacking. A relay attack is a type of hacking technique related to man-in-the middle attacks. In a man-in-the-middle attack, communication between the Access Controller 106 and a Credential Device 104 is initiated by the attacking device, and the attacking device merely relays messages between the two legitimate devices. The Credential Device 104 may be remote from the controlled physical portal, but the Access Controller 106 grants access as if the legitimate Credential Device 104 were present. This may allow access to the holder of the attacking device to the controlled portal.

Figure 2:
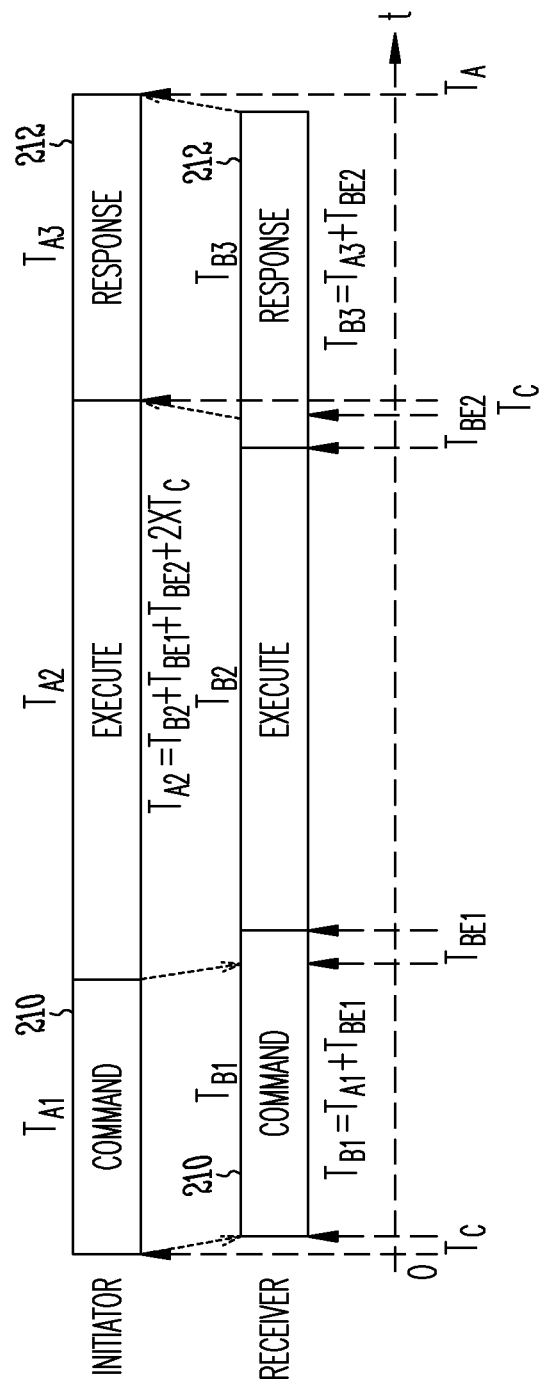
FIG. 2 is a timing diagram representing an example of a command sent by an initiator device and received by a receiving device.

FIG. 2 is a timing diagram representing a command sent by an initiator device and received by a receiving device. The initiator device may be an interface terminal of a physical access control system (e.g., a Reader Device of a PACS or other verifier device) and the receiving device may be a Credential Device. The initiator device and the receiver device include physical (PHY) layer circuitry and processing circuitry. The initiator device transmits a command 210 to the receiver device. The command 210 may be included in an authentication protocol communicated between the initiator device and the receiver device.

The command 210 is transmitted by the initiator device during time $T_{A1}$. The receiving device starts to receive the command 210 after a delay of $T_C$, and the command 210 is received by the receiving device during time $T_{B1}$. Time $T_C$ is a communication gap and is the time from when the data is sent by the initiator device until the receiver device recognizes the data. When all the information of the command message is received, the receiver device executes the command during time $T_{B2}$. There may be a receiver execution gap ($T_{Be1}$) between the time the receiver device receives all the data related to the command until the receiver application starts to execute the command 210. The receiver device command receive time is $T_{B1}=T_{A1}+T_{Be1}$.

When the receiver device application completes executing the command 210, it sends a response 212 to the initiator device during time $T_{B3}$. There may be a second receiver execution gap ($T_{Be2}$) between the time the receiver device executes the received command and the time until the protocol layer of the receiver device prepares the data and begins to send the response data. There is also a second communication gap $T_C$ between the time that the receiver device starts to send the response 212 and the initiator device starts to receive the response. To the initiator device it appears that the time used by the receiver device to execute the command is $T_{A2}$, where $$T_{A2}=T_{B2}+T_{Be1}+T_{Be2}+2(T_C).$$

If the first communication gap and the second communication gap are different (e.g., $T_{C1}$ and $T_{C2}$), then the term $2(T_C)$ is replace by $(T_{C1}+T_{C2})$. The initiator device receives the response 212 to the command during $T_{A3}$.

The time that the receiving device receives the command 210, executes the command, and sends the response 212 is $$T_B=T_{B1}+T_{B2}+T_{B3}.$$

The total time from when the initiator device starts to send the command to when the initiator device completes receiving the response to the command is $$T_A=T_{A1}+T_{A2}+T_{A3}, \text{ and}$$

$$T_A=T_B+2(T_C).$$

When there is a relay attack, there will be some non-zero time that the command and response pass through the attacking device or devices. The additional devices will additional communication gaps $T_C$ in the transmitting and receiving of the command and response. In a perfect relay attack, the attacking device or devices will be as efficient as possible.

Figure 3:
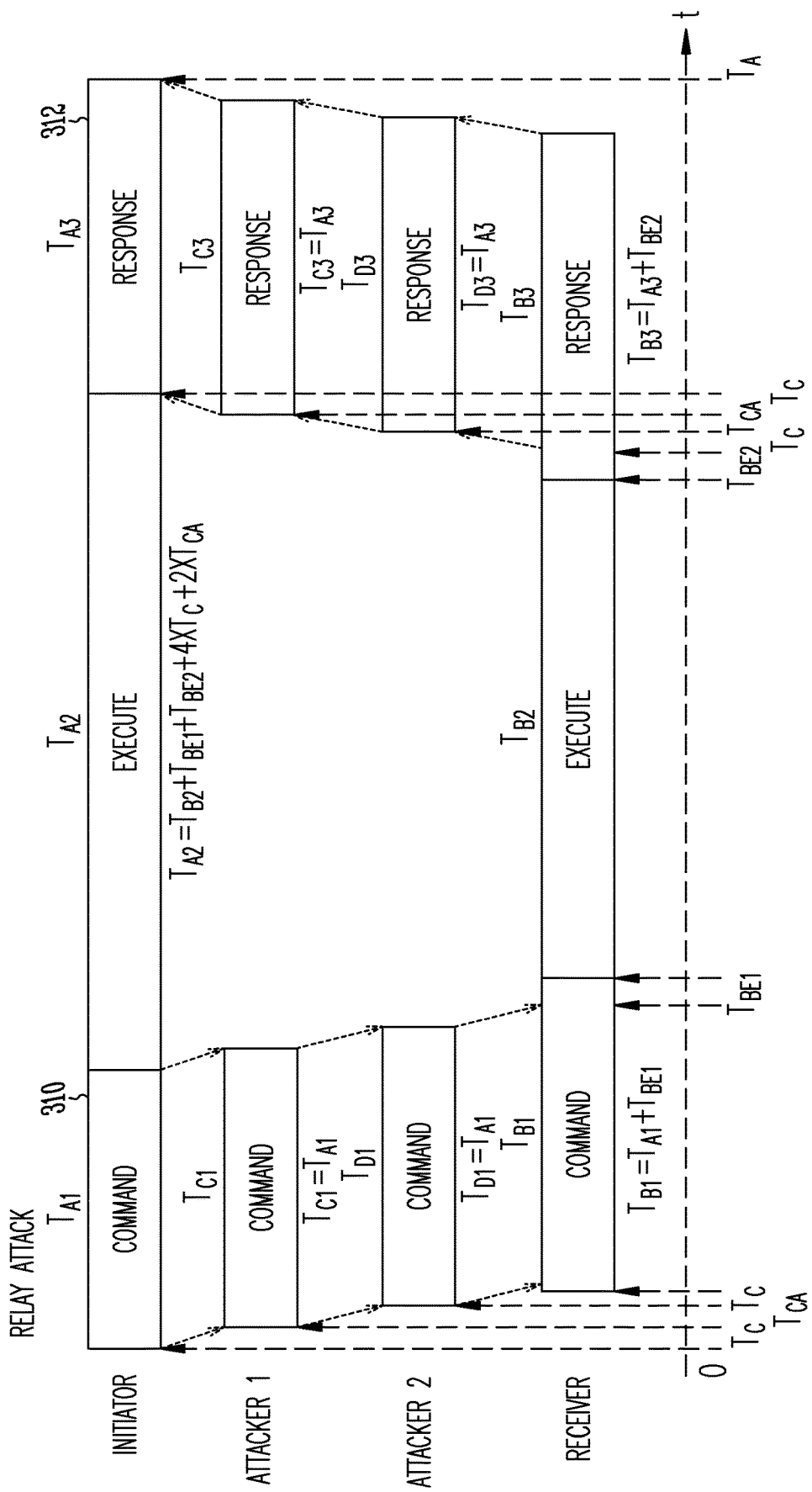
FIG. 3 is a timing diagram representing an example of a relay attack involving a command sent by an initiator device received by a receiving device.

FIG. 3 is a timing diagram representing a command 310 sent by an initiator device, relayed by two attacking devices in a relay attack, and then received by a receiver device. The attacking devices add a communication gap $T_C$ to the sending of the command 310 by the initiator device and the receiving of the command 310 by the receiver device. There is also a communication gap $T_{Ca}$ between the attacking devices. The communication gap $T_{Ca}$ between the attacking devices may be less than the communication $T_C$. The communication between the attacking devices can be very efficient because the attacking devices can use any proprietary communication protocol. The communication gap $T_{Ca}$ is added to the sending of the command 310 by the initiator device and the receiving of the command 310 by the receiver device.

The attacking devices also add the $T_C$ and $T_{Ca}$ communication gaps to the sending of the response 312 by the receiver device and the receiving of the response 312 by the initiator device. The total time from when the initiator device starts to send the command to when the initiator device completes receiving the response 312 to the command is $$T_A=T_B+4(T_C)+2(T_{Ca}).$$

The normal time for sending the command and receiving the response is $$T_A=T_B+2(T_C).$$

The difference in time between the normal communication and the relay attack communication is $2(T_C)+2(T_{Ca})$. If the communication gaps are different between directions from initiator to receiver and receiver to initiator, the time difference may be $(T_{C1}+T_{C2})+(T_{Ca1}+T_{Ca2})$. The difference in communication time can be used by one or both of the initiator device and the receiving device to detect the relay attack. In FIG. 3, if the time increases by an attack detection threshold duration of $2(T_C)+2(T_{Ca})$ or greater, then there may be a relay attack. These times are examples for a perfect attack scenario and the actual communication time added by an attacking device will likely be greater.

The initiator device can measure the communication times to detect a relay attack. The measurements performed can include transmitting a command-response pair. As shown in the examples of FIGS. 2 and 3, a command-response pair includes the command sent from the initiator device, the execution of the command by the receiver device, and the response sent by the receiver device. As shown in the examples of FIGS. 2 and 3, the timing of the three parts of the command-response pair are different for the initiator device and the receiving device. Because the timing is different, the whole command-response pair is measured. A measurement command-response pair from the initiator device is measured and used to set the expected timing of a command-response pair. A second command-response pair from the receiving device is measured and compared to the expected timing. If the second command-response pair exceeds the expected timing by a predetermined threshold, there may be a relay attack.

Figure 4:
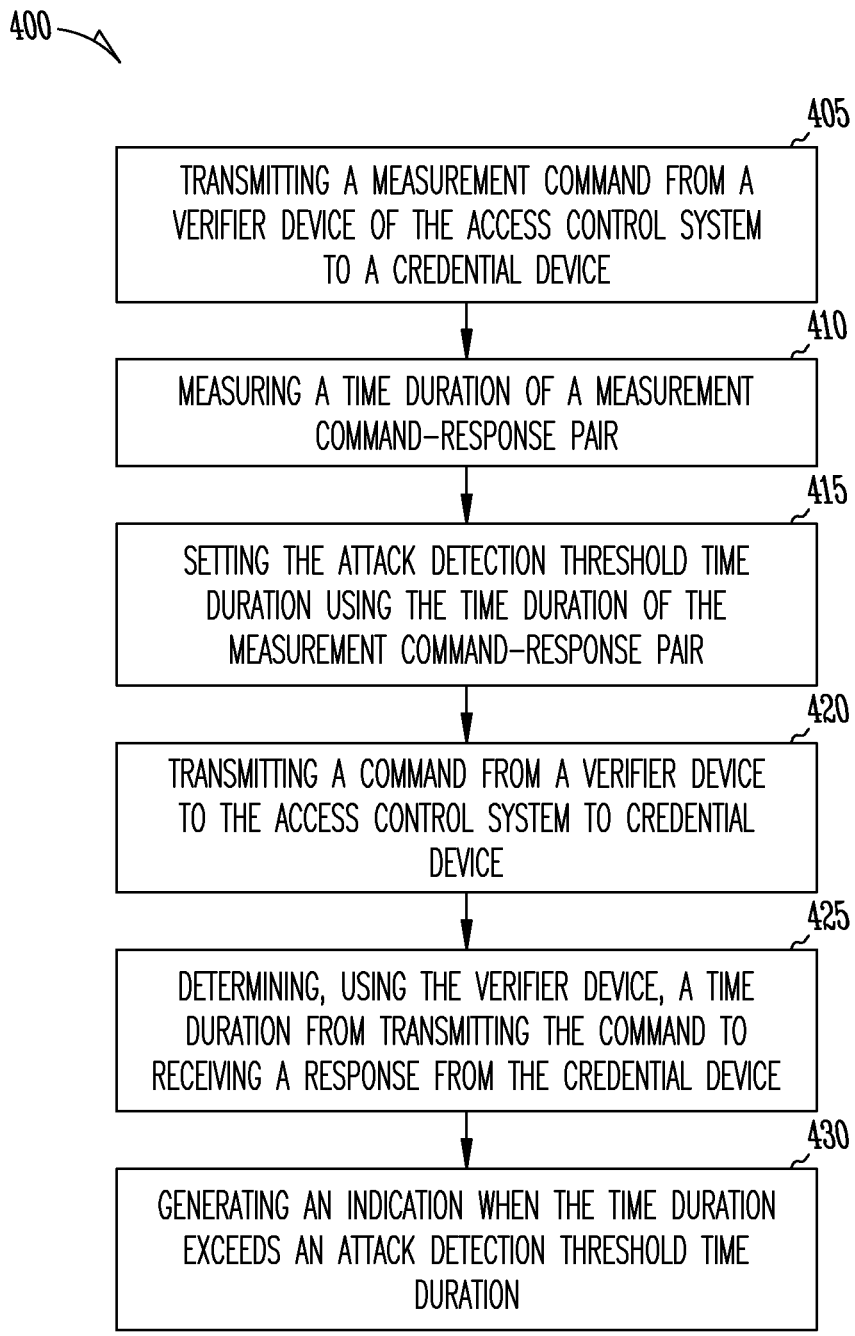
FIG. 4 is a flow diagram of an example of a method of operating an access control system.

FIG. 4 is a flow diagram of an example of a method 400 of operating an access control system. At 405, a measurement command is transmitted from a verifier device of the access control system to a credential device. The measurement command may be transmitted wirelessly to the credential device according to a wireless communication protocol (e.g., the Bluetooth® protocol) using physical layer circuitry of the verifier device. The credential device may be a smart credential device (e.g., a smartphone or smartcard) storing access credential information. In variations, the interface between the verifier device and the credential device may be a wired interface, and the measurement command can be transmitted according to a wired communication protocol.

The verifier device may be an authorization-only device that compares the credential information to credential information that is allowed access, or the verifier device may be a combination authorization and control device that evaluates credential information and provides access through a physical portal (e.g., a door) when the credential information meets the criteria for access.

At 410, a response to the measurement command is received by the verifier device which, measures the time duration of the measurement command-response pair. The time duration of the measurement command-response pair may be measured from the time of transmitting the measurement command to the time that the verifier device receives the response to the measurement command from the credential device.

At 415, the processing circuitry of the verifier device sets the value of an attack detection threshold time duration using the measured time duration of the measurement command-response pair. In certain examples, the processing circuitry of the verifier device adds a predetermined time duration to the measured time duration to determines the attack detection threshold time duration.

At 420, a second command from the verifier device is transmitted to a credential device. The second command may be the same as the measurement command. In some examples, multiple command-response pairs are transmitted between the devices. In certain examples, the measurement command and the second command are both mutual authentication command messages. Any communication mechanism can be used in which the sending message is not restarted or repeated. Message chaining, splitting into multiple frames, wait time extensions, or similar mechanisms can be included in the sending message. At 425, a response to the second command is received by the verifier device and the processing circuitry of the verifier device calculates the time duration of the second command-response pair.

At 430, the processing circuitry of the verifier device generates an indication when the time duration exceeds an attack detection threshold time duration. The indication may be a signal sent to alarm circuitry of the verifier device or alarm circuitry of a second device. In variations, the indication may be a predetermined message transmitted from the verifier device to a separate device such as an access control device. The second command may be recurrently transmitted, and the second command-response pair measured to recurrently check for a relay attack.

Other parameters of the command-response pair can be calculated and used to detect a relay attack. In some examples, the processing circuitry of the verifier device calculates the communication speed of sending and receiving the measurement command-response pair and sets the value of an attack detection communication speed threshold using the measured communication speed. The communication speed of the second command-response pair is calculated and compared to the detection threshold speed. The processing circuitry of the verifier device generates the indication of a relay attack using one or both of the calculated communication speed and the determined time duration. The verifier device may send the attack detection threshold or thresholds to the credential device, and either the credential device or the verifier device may detect the threshold attack.

The measurements for detecting a relay attack may be performed by the credential device. The credential device sends the measurement command of the measurement command-response pair. The physical layer circuitry of the verifier device receives the measurement command from the credential device and initiates transmission of a response message to the credential device in response to the measurement command. The credential device may send the measured time duration to the verifier device. One or both of the credential device and the verifier device may calculate the time duration of a subsequent command-response pair, and use the calculated times to detect a relay attack.

As explained previously herein, any communication mechanism that is not restarted or repeated can be used for the sending message or command and used in the timing measurements. Conversely, communication mechanism that are restarted or repeated should not be used. This includes error correction (e.g., error correction coding or ECC). If the message used for measurement includes multiple frames, error correction should be omitted from the first frame of the multi-frame message. Error correction on the first frame may add an additional gap between both timing measurements that can lead to a wrong relay detection. Error correction on the other frames would not cause an incorrect detection using the multi-frame command-response pair.

The comparison of the timing measurements is used to decide whether the command-response pair is relayed. The timing measurement values may be based on the type of receiver device. The behavior of a hardware platform of a receiver device may result in using different comparison algorithms. For example, when a command is received on the receiver device for some platforms, it is not guaranteed it will be immediately executed. In another example, when a command is executed on the receiver device it is not guaranteed that the response will be immediately sent.

The systems, devices, and methods described herein provide a reliable way to detect a relay attack between two devices. Timing measurements for the attack detection are determined and may be shared between the devices.

Figure 5:
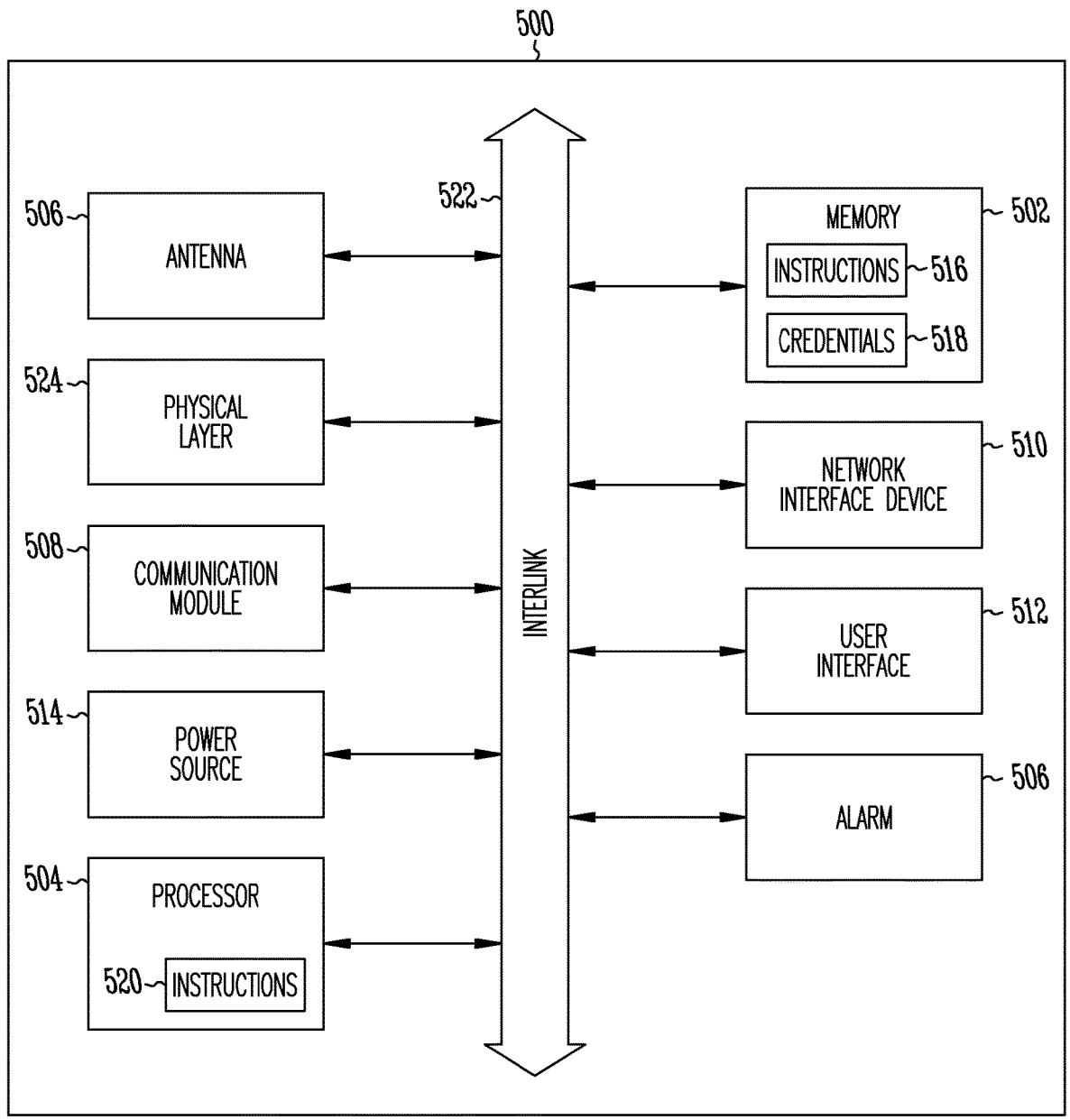
FIG. 5 is a block diagram schematic of portions of an example of a verifier device.

FIG. 5 is a block diagram schematic of various example components of a device 500 (e.g., an embedded device) for supporting the device architectures described and illustrated herein. The device 500 of FIG. 5 could be, for example, a verifier or reader device that authenticates credential information of authority, status, rights, and/or entitlement to privileges for the holder of a credential device. At a basic level, a reader device can include an interface (e.g., one or more antennas and Integrated Circuit (IC) chip(s)), which permit the reader device to exchange data with another device, such as a credential device or another verifier device. One example of credential device is an RFID smartcard that has data stored thereon allowing a holder of the credential device to access a secure area or asset protected by the reader device.

With reference specifically to FIG. 5, additional examples of a device 500 for supporting the device architecture described and illustrated herein may generally include one or more of a memory 502, a processor 504, one or more antennas 506, a communication port or communication module 508, a network interface device 510, a user interface 512, and a power source 514 or power supply.

Memory 502 can be used in connection with the execution of application programming or instructions by processing circuitry, and for the temporary or long-term storage of program instructions or instruction sets 516 and/or authorization data 518, such as credential data, credential authorization data, or access control data or instructions, as well as any data, data structures, and/or computer-executable instructions needed or desired to support the above-described device architecture. For example, memory 502 can contain executable instructions 516 that are used by a processor 504 of the processing circuitry to run other components of device 500, to make access determinations based on credential or authorization data 518, and/or to perform any of the functions or operations described herein, such as the method of FIG. 4 for example. Memory 502 can comprise a computer readable medium that can be any medium that can contain, store, communicate, or transport data, program code, or instructions for use by or in connection with device 500. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), Dynamic RAM (DRAM), any solid-state storage device, in general, a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Processor 504 can correspond to one or more computer processing devices or resources. For instance, processor 504 can be provided as silicon, as a Field Programmable Gate Array (FPGA), an Application-Specific Integrated Circuit (ASIC), any other type of Integrated Circuit (IC) chip, a collection of IC chips, or the like. As a more specific example, processor 504 can be provided as a microprocessor, Central Processing Unit (CPU), or plurality of microprocessors or CPUs that are configured to execute instructions sets stored in an internal memory 520 and/or memory 502.

Antenna 506 can correspond to one or multiple antennas and can be configured to provide for wireless communications between device 500 and another device. Antenna(s) 506 can be coupled to one or more physical (PHY) layers 524 to operate using one or more wireless communication protocols and operating frequencies including, but not limited to, the IEEE 802.15.1, Bluetooth, Bluetooth Low Energy (BLE), near field communications (NFC), ZigBee, GSM, CDMA, Wi-Fi, RF, UWB, and the like. In an example, antenna 506 may include one or more antennas coupled to one or more physical layers 524 to operate using ultra-wide band (UWB) for in band activity/communication and Bluetooth (e.g., BLE) for out-of-band (OOB) activity/communication. However, any RFID or personal area network (PAN) technologies, such as the IEEE 502.15.1, near field communications (NFC), ZigBee, GSM, CDMA, Wi-Fi, etc., may alternatively or additionally be used for the OOB activity/communication described herein.

Device 500 may additionally include a communication module 508 and/or network interface device 510. Communication module 508 can be configured to communicate according to any suitable communications protocol with one or more different systems or devices either remote or local to device 500. Network interface device 510 includes hardware to facilitate communications with other devices over a communication network utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi, IEEE 802.16 family of standards known as WiMax), IEEE 802.15.4 family of standards, and peer-to-peer (P2P) networks, among others. In some examples, network interface device 510 can include an Ethernet port or other physical jack, a Wi-Fi card, a Network Interface Card (NIC), a cellular interface (e.g., antenna, filters, and associated circuitry), or the like. In some examples, network interface device 510 can include a plurality of antennas to wirelessly communicate using at least one of single-input multiple-output (SIMO), multiple-input multiple-output (MIMO), or multiple-input single-output (MISO) techniques. In some example embodiments, one or more of the antenna 506, communication module 508, and/or network interface device 510 or subcomponents thereof, may be integrated as a single module or device, function or operate as if they were a single module or device, or may comprise of elements that are shared between them.

User interface 512 can include one or more input devices and/or display devices. Examples of suitable user input devices that can be included in user interface 512 include, without limitation, one or more buttons, a keyboard, a mouse, a touch-sensitive surface, a stylus, a camera, a microphone, etc. Examples of suitable user output devices that can be included in user interface 512 include, without limitation, one or more LEDs, an LCD panel, a display screen, a touchscreen, one or more lights, a speaker, etc. It should be appreciated that user interface 512 can also include a combined user input and user output device, such as a touch-sensitive display or the like. The user interface 512 may include a separate alarm circuit 526 to indicate an alarm condition such as a relay attack or other security breach. Alarm circuit 526 may provide an audio signal to a speaker or may activate a light or present an alarm condition using a display device.

Power source 514 can be any suitable internal power source, such as a battery, capacitive power source or similar type of charge-storage device, etc., and/or can include one or more power conversion circuits suitable to convert external power into suitable power (e.g., conversion of externally-supplied AC power into DC power) for components of the device 500.

Device 500 can also include one or more interlinks or buses 522 operable to transmit communications between the various hardware components of the device. A system bus 522 can be any of several types of commercially available bus structures or bus architectures.

ADDITIONAL DISCLOSURE AND EXAMPLES

Example 1 includes subject matter (such as a read device of an access control system) comprising physical layer circuitry and processing circuitry operatively coupled to the physical layer circuitry. The processing circuitry is configured to initiate transmission of a command to a credential device, determine a time duration from sending the command to the credential device to receiving a response to the command from the credential device, and generate an indication when the time duration exceeds a relay attack detection threshold time duration.

In Example 2, the subject matter of Example 1 optionally includes processing circuitry configured to determine the time duration from a start of transmitting the command to an end of receiving the response.

In Example 3, the subject matter of one or both of Examples 1 and 2 optionally includes processing circuitry configured to initiate transmission of a measurement command to the credential device, measure a time duration of a measurement command-response pair, wherein the time duration of the measurement command-response pair is measured from the transmitting of the measurement command to receiving a response to the measurement command from the credential device, and determine the attack detection threshold time duration using the time duration of the measurement command-response pair.

In Example 4, the subject matter of Example 3 optionally includes the transmitted command and the transmitted measurement command both being mutual authentication command messages.

In Example 5, the subject matter of one or any combination of Examples 1~4 optionally includes processing circuitry configured to calculate communication speed of sending the command and receiving the response, and generate the indication using the calculated communication speed and the determined time duration.

In Example 6, the subject matter of one or any combination of Examples 1-5 optionally includes processing circuitry configured to initiate transmitting a multi-frame command to the credential device, omit error correction on the first frame of the transmitted multi-frame message and the first frame of the response message, and determine a time duration from sending the multi-frame command to receiving a response to the multi-frame command.

In Example 7, the subject matter of one or any combination of Examples 1-6 optionally includes physical layer circuitry configured to receive a measurement command from the credential device, and processing circuitry configured to initiate transmission of a response message to the credential device in response to the measurement command.

Example 8 includes subject matter (such as a method of operating an access control system) or can optionally be combined with one or any combination of Examples 1-7 to include such subject matter, comprising transmitting a command from a verifier device of the access control system to a credential device, determining, using the verifier device, a time duration from transmitting the command to receiving a response from the credential device, and generating an indication when the time duration exceeds an attack detection threshold time duration.

In Example 9, the subject matter of one or any combination of Example 8 optionally includes transmitting a measurement command from the verifier device to the credential device, measuring a time duration of a measurement command-response pair, wherein the time duration of the measurement command-response pair is measured from the transmitting of the measurement command to receiving a response to the measurement command from the credential device, and setting the attack detection threshold time duration using the time duration of the measurement command-response pair.

In Example 10, the subject matter of Example 9 optionally includes the transmitted command and the transmitted measurement command both being authentication command messages.

In Example 11, the subject matter of one or any combination of Examples 8-10 optionally includes calculating, using the verifier device, communication speed of the command and response, and generating the indication using the calculated communication speed and the determined time duration.

In Example 12, the subject matter of one or any combination of Examples 8-11 optionally includes transmitting a multi-frame command from the verifier device to the credential device, omitting error correction on the first frame of the multi-frame message using the credential device or the verifier device, and determining the time duration from transmitting the multi-frame command to receiving a response to the multi-frame command from the credential device.

In Example 13, the subject matter of one or any combination of Examples 8-12 optionally includes transmitting a command from the credential device to the verifier device, determining, using the credential device, a time duration from transmitting the command to receiving a response from the verifier device, and generating an indication when the time duration exceeds the attack detection threshold time duration.

In Example 14, the subject matter of one or any combination of Examples 8-13 optionally includes a verifier device that is a reader device and the credential device that is a smart card.

In Example 15, the subject matter of one or any combination of Examples 8-14 optionally includes a verifier device that is a reader device and the credential device that is a smart phone.

Example 16 includes subject matter or can optionally be combined with one or any combination of Examples 1-15 to include such subject matter, such as a computer-readable storage medium including instructions that, when executed by processing circuitry of a verifier device of an access control system, cause the verifier device to perform acts comprising transmitting a command to a credential device, determining a time duration from transmitting the command to receiving a response from the credential device, and generating an indication when the time duration exceeds an attack detection threshold time duration.

In Example 17, the subject matter of Example 16 optionally includes instructions that cause the verifier device to perform acts comprising transmitting a measurement command to the credential device, measuring a time duration of a measurement command-response pair, wherein the time duration of the measurement command-response pair is measured from the transmitting of the measurement command to receiving a response to the measurement command from the credential device, and setting the attack detection threshold time duration using the time duration of the measurement command-response pair.

In Example 18, the subject matter of one or both of Examples 16 and 17 optionally includes instructions that cause the verifier device to send an authentication command for both the transmitted command and transmitted measurement command.

In Example 19, the subject matter of one or any combination of Examples 16-18 optionally includes instructions that cause the verifier device to perform acts comprising calculating communication speed of the command and response, and generating the indication using the calculated communication speed and the determined time duration.

In Example 20, the subject matter of one or any combination of Examples 16-19 optionally includes instructions that cause the verifier device to perform acts comprising transmitting a multi-frame command from the verifier device to the credential device, omitting error correction on the first frame of the multi-frame message using the credential device or the verifier device, and determining the time duration from transmitting the multi-frame command to receiving a response to the multi-frame command from the credential device.

These non-limiting Examples can be combined in any permutation or combination. The above detailed description includes references to the accompanying drawings, which form a part of the detailed description. The drawings show, by way of illustration, specific embodiments in which the invention can be practiced. The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, the subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. A method of operating an initiator device of an access control system, the method comprising:
   transmitting a measurement command from the initiator device to a responder device of the access control system;
   determining, by the initiator device, a first time duration from the sending of the measurement command to receiving a response message to the measurement command from the responder device;
   receiving, from the responder device, a second time duration measured by the responder device that includes executing time of the received measurement command by the responder device; and
   detecting a relay attack using a comparison of the first time duration and the second time duration.

2. The method of claim 1, wherein detecting the relay attack includes detecting the relay attack using the first and second time durations and an attack detection threshold.

3. The method of claim 2, including the initiator device setting a value of the attack detection threshold according to a type of platform of the responder device.

4. The method of claim 2, including the initiator device setting a value of the attack detection threshold according to a protocol layer of the responder device.

5. The method of claim 2, including the initiator device setting a value of the attack detection threshold to include a time delay for a protocol layer of the responder device to send the response message using one of an IEEE 802.15.1 protocol, Bluetooth protocol, Bluetooth Low Energy (BLE) protocol, or near field communications (NFC) protocol.

6. The method of claim 1, including sending, by the initiator device, a predetermined message to an access control device in response to detecting the relay attack.

7. The method of claim 1, including the initiator device authenticating an access credential received from the responder device.

8. The method of claim 1, including the initiator device sending an access credential to the responder device.

9. The method of claim 1, including:
   the initiator device receiving a responder-determined time duration in the response message; and
   the initiator device generating an indication of the relay attack using the responder-determined time duration.

10. An initiator device of an access control system, the initiator device comprising:
    physical layer circuitry configured to send and receive messages with a responder device of the access control system; and
    processing circuitry operatively coupled to the physical layer circuitry and configured to:
    initiate transmission of a measurement command to the responder device;
    determine a first time duration from the sending of the measurement command to receiving a response message to the measurement command from the responder device;
    receive a second time duration from the responder device and measured by the responder device that includes executing time of the received measurement command by the responder device; and
    generate an indication of a relay attack according to a comparison of the first and second time durations.

11. The initiator device of claim 10, wherein the processing circuitry is configured to detect the relay attack using the first time duration, second time duration, and an attack detection threshold.

12. The initiator device of claim 11, wherein the processing circuitry is configured to set the value of the attack detection threshold according to a type of platform of the responder device.

13. The initiator device of claim 11, wherein the processing circuitry is configured to set the value of the attack detection threshold according to a protocol layer of the responder device.

14. The initiator device of claim 10, wherein the physical layer circuitry is connected to a wired interface to the responder device.

15. The initiator device of claim 10, wherein the initiator device is a credential device of the access control system.

16. The initiator device of claim 10, wherein the initiator device is a verifier device of the access control system.

17. The initiator device of claim 10, wherein the processing circuitry is configured to determine authentication information included in the response message from the responder device.

18. The initiator device of claim 10, wherein the processing circuitry is configured to initiate transmission of a predetermined message to an access control device when the second time duration exceeds the attack detection threshold time duration.

19. A non-transitory computer-readable storage medium including instructions that, when executed by processing circuitry of an initiator device of an access control system, cause the initiator device to perform acts comprising:
    transmitting a measurement command to a responder device of the access control system;
    determining a first time duration from the sending of the measurement command to receiving a response message from the responder device;
    receiving a second time duration from the responder device and measured by the responder device that includes executing time of the received measurement command by the responder device; and
    generating an indication of a relay attack according to a comparison of the first and second time durations.

20. The non-transitory computer-readable storage medium of claim 19, including instructions that cause the initiator device to perform acts including:
    setting a value of an attack detection threshold time duration according to a type of platform of the responder device; and
    generating an indication of a relay attack according to a comparison of the first and second time durations and the value of the attack detection threshold time duration.

* * * * *